Dec. 8, 1936.  W. P. COX  2,063,587

BEARING CAGE

Original Filed Feb. 21, 1935

INVENTOR:
William P. Cox,
by Carr Kan & Gravely
HIS ATTORNEYS

Patented Dec. 8, 1936

2,063,587

UNITED STATES PATENT OFFICE 2,063,587

BEARING CAGE

William P. Cox, Canton, Ohio, assignor to The Timken Roller Bearing Company, Canton, Ohio, a corporation of Ohio Original application February 21, 1935, Serial No. 7,490. Divided and this application April 18, 1936, Serial No. 75,043

5 Claims. (Cl. 308—218)

My invention relates to cages for roller bearings, particularly to cages for heavy duty roller bearings such as bearings used in railway cars, rolling mills and other heavy machinery. The invention has for its principal object a cage which can be disassembled to permit removal of some or all of the rollers therefrom without damage to either cage or rollers. This application is a division of my application Serial No. 7,490 filed February 21, 1935.

The invention consists principally in a bearing cage having a separate large end ring removably secured to the bridges of the cage. The invention further consists in the bearing cage and in the parts and combinations of parts hereinafter described and claimed.

Figure 1:
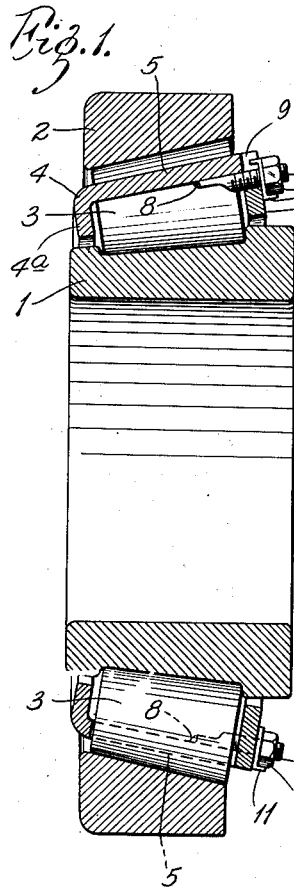
Figure 2:
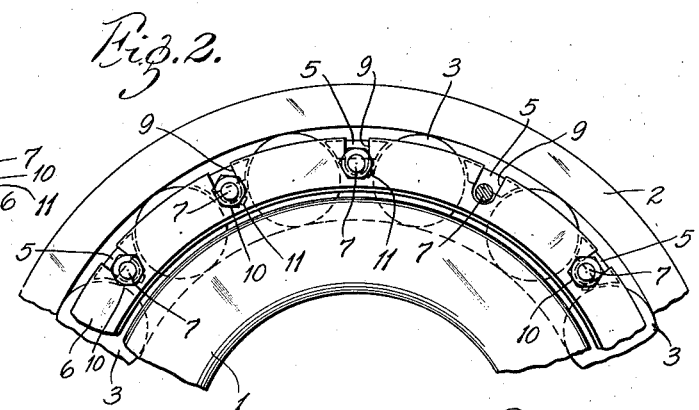
Figure 3:
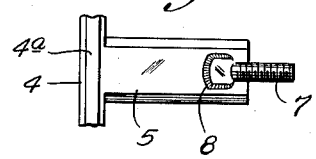
Figure 5:
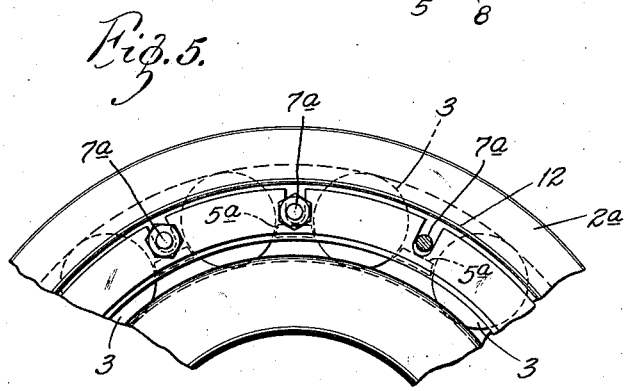
Figure 4:
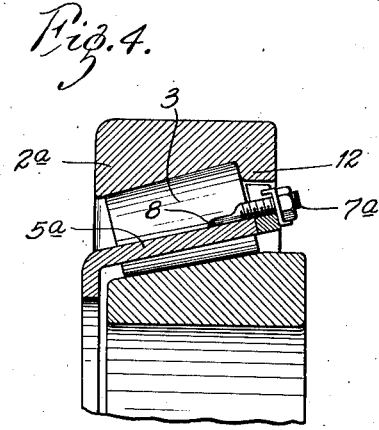
Figure 6:
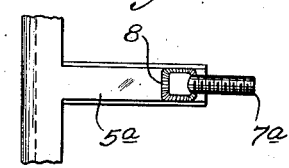

In the accompanying drawing, which forms part of this specification and wherein like symbols refer to like parts wherever they occur, Fig. 1 is a longitudinal sectional view of a bearing having a cage embodying my invention, Fig. 2 is a partial end view, Fig. 3 is a detail view of one of the bridges of the cage, and Figs. 4, 5 and 6 are views similar to Figs. 1, 2, and 3, respectively, showing a modified form of cage.

In the drawing is illustrated a taper roller bearing including a cone 1 or inner bearing member, a cup 2 or outer bearing member, and conical rollers 3 therebetween, the rollers being held in a cage constituting the subject matter of this invention.

In the construction shown in Figs. 1, 2 and 3, the conical cage 4 has a flanged small end ring 4a and longitudinally extending bridges 5 projecting therefrom, said bridges forming the sides of the pockets for the rollers 3. At the large end of the cage a separate ring 6 is removably secured to the bridges.

As shown in Figs. 1, 2 and 3, threaded bolts 7 projecting longitudinally beyond the bridges 5 are secured to the inner faces of the several bridges, as by welding, indicated at 8. The separate end ring 6 has notches 9 extending radially inwardly from the outer periphery of the ring and receiving said bolts 7. Nuts 10 mounted on said bolts are drawn up against the separate end rings 6 to hold said end rings in position against the ends of the bridges 5. Suitable locking means 11 may be provided for holding the nuts 10 in position. Thus the cage and rollers are securely held in assembled position when the bearing is in use, but when it is desired to dismantle the bearing, the nuts 10 may be removed thus permitting the withdrawal of the loose end ring 6 and the removal of any rollers 3 that may need replacement.

The construction shown in Figs. 4, 5 and 6 is quite similar to that shown in Figs. 1, 2 and 3. In this modification the thrust rib 12 of the bearing is on the cup 2a or outer bearing member and the bridges 5a are disposed inwardly of the axial line of the rollers 3, thus holding the rollers in assembly with the cup. In this modification the bolt members 7a are secured to the outer faces of the bridges 5a.

The cage above described facilitates the assembling of the rollers of a large bearing and permits the removal of some or all of the rollers without injury to the rollers or to the cage itself, the same cage parts being used when the bearing is reassembled.

What I claim is:

1. A bearing cage comprising an end ring, bridges integral therewith, a separate end ring mounted at the other end of said bridges, radially offset members secured to said bridges inwardly of their ends and having threaded portions projecting longitudinally beyond the ends of said bridges, said separate end ring having openings receiving said threaded portions and nuts on said threaded ends holding said separate end ring in place.

2. A bearing cage comprising an end ring, bridges integral therewith, a separate end ring mounted at the other end of said bridges, radially offset bolts secured to said bridges inwardly of their ends with their threaded ends projecting longitudinally therebeyond, said end ring having slots therein to receive said bolts and nuts on the ends of said bolts.

3. A bearing cage comprising an end ring, bridges integral therewith, a separate end ring mounted at the other ends of said bridges in engagement with said ends, radially offset members welded to said bridges inwardly of their ends and having threaded portions projecting longitudinally beyond said bridges, said end ring having slots therein to receive said threaded end portions and nuts on the ends of said slots.

4. A bearing cage comprising an end ring, bridges integral therewith, a separate end ring mounted at the other ends of said bridges in engagement with said ends, members welded to the outer faces of said bridges inwardly of their ends and having threaded portions projecting longitudinally beyond said bridges, said end ring having slots therein to receive said threaded end portions and nuts on the ends of said slots.

5. A bearing cage comprising an end ring, bridges integral therewith, a separate end ring mounted at the other ends of said bridges in engagement with said ends, members welded to the inner faces of said bridges inwardly of their ends and having threaded portions projecting longitudinally beyond said bridges, said end ring having slots therein to receive said threaded end portions and nuts on the ends of said slots.

WILLIAM P. COX.